Jan. 17, 1956 J. W. BRUNDAGE 2,730,763
TIRE CURING PRESS
Filed May 6, 1953 12 Sheets-Sheet 1

INVENTOR.
JAMES W. BRUNDAGE
BY
Oberlin & Limbach
ATTORNEYS

INVENTOR.
JAMES W. BRUNDAGE
BY
Oberlin & Limbach
ATTORNEYS

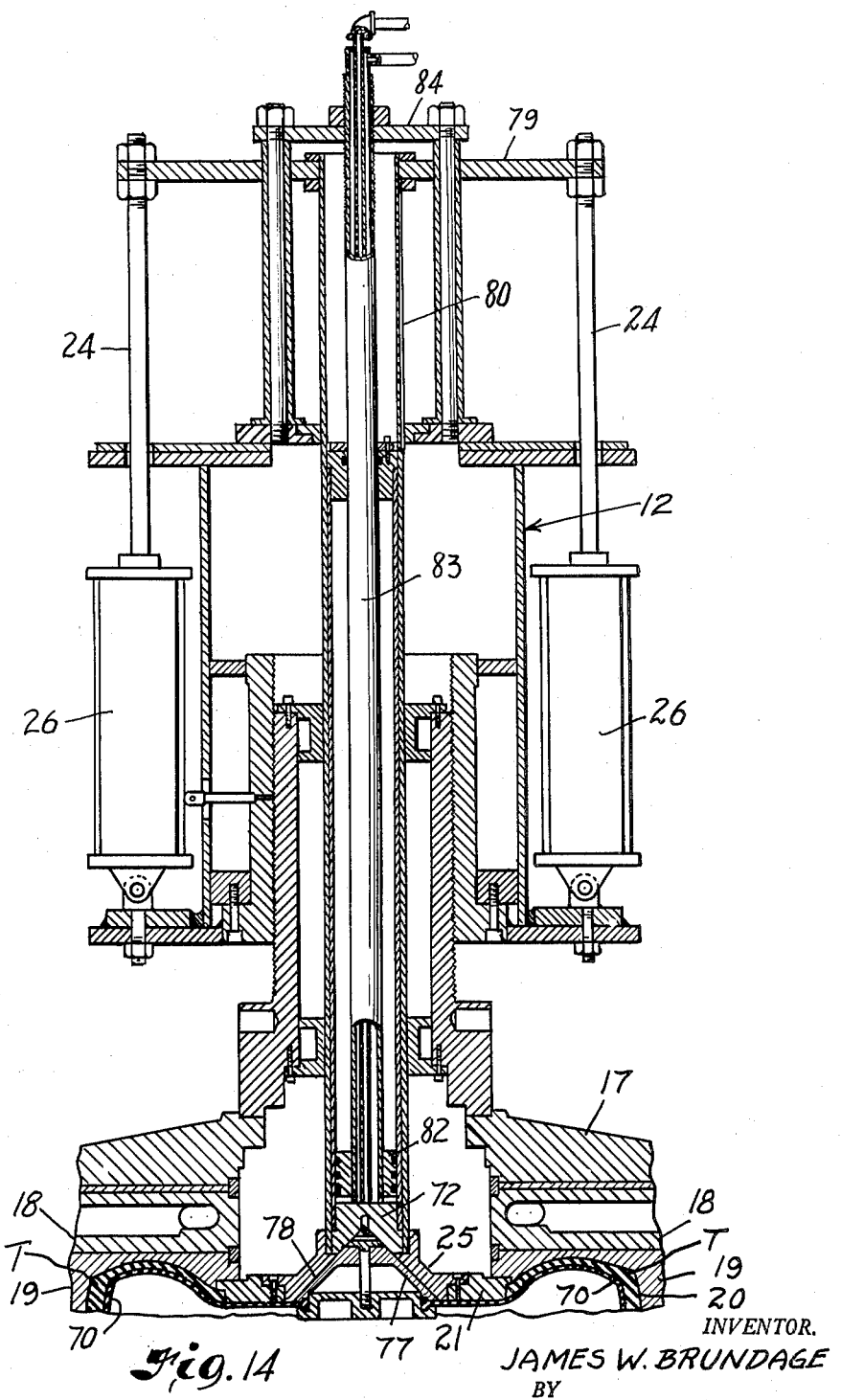

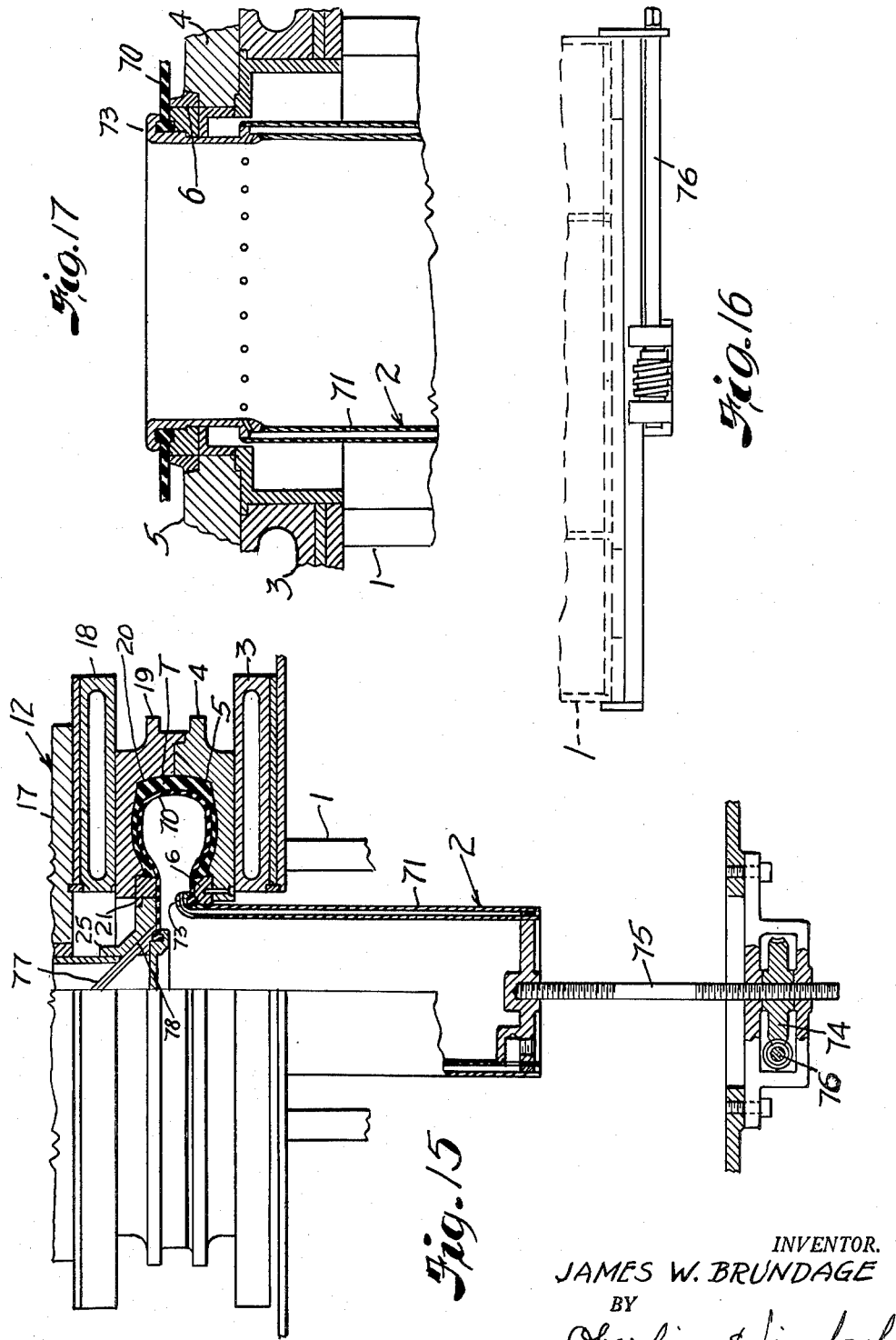

Jan. 17, 1956  J. W. BRUNDAGE  2,730,763
TIRE CURING PRESS

Filed May 6, 1953 12 Sheets-Sheet 9

INVENTOR.
JAMES W. BRUNDAGE
BY
Oberlin & Limbach
ATTORNEYS.

INVENTOR.
JAMES W. BRUNDAGE
BY
Oberlin & Limbach
ATTORNEYS.

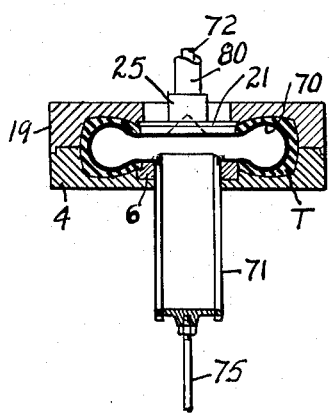
Fig. 26
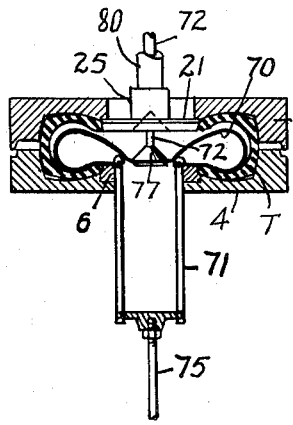
Fig. 27
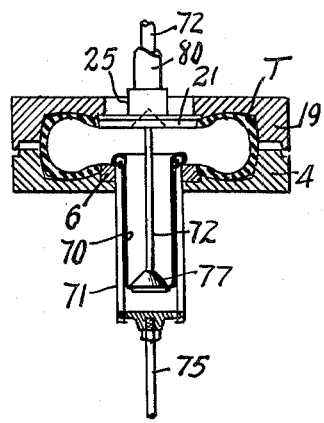
Fig. 28
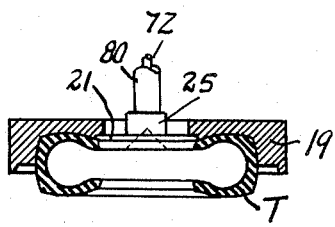
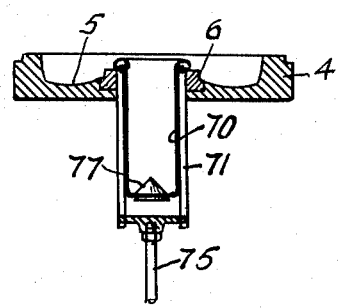
Fig. 29
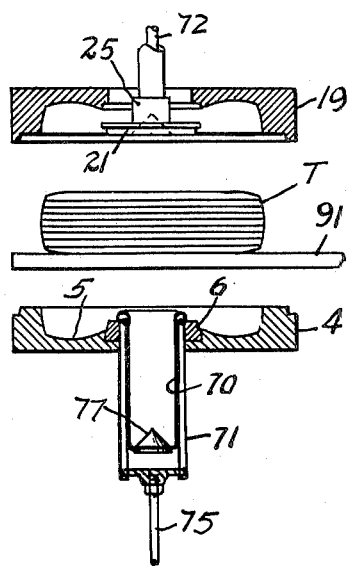
Fig. 30
INVENTOR.
JAMES W. BRUNDAGE
BY
Oberlin & Limbach
ATTORNEYS.

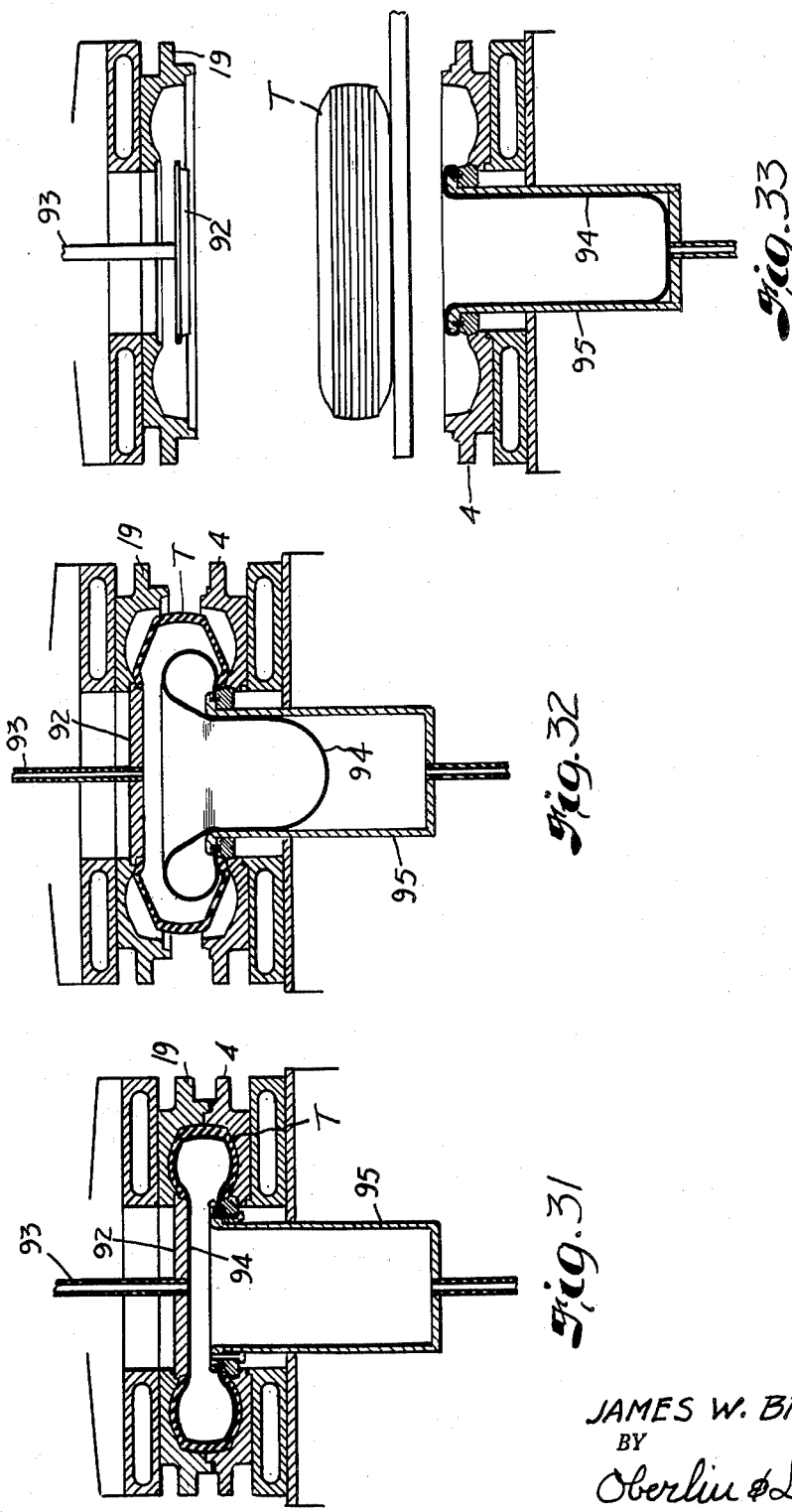

United States Patent Office 2,730,763
Patented Jan. 17, 1956

2,730,763

TIRE CURING PRESS

James W. Brundage, Akron, Ohio, assignor to National Rubber Machinery Company, Akron, Ohio, a corporation of Ohio Application May 6, 1953, Serial No. 353,354

39 Claims. (Cl. 18—17)

The present invention relates generally as indicated to a tire curing press and to a tire shaping device for use therewith. More particularly, this invention relates to a tire curing press of the type having a tire shaping device in the form of a radially expansible former assembly disposed between complementary relatively movable tire mold sections and adapted to progressively deform a pulley band tire carcass encircling said device to tire shape during movement of said mold sections in contact with the beads of the carcass to a closed mating position, said device further being operative to hold the deformed carcass in a tire shape in the closed mold whereby circulation of a heated curing medium through the interior of said device and through platens associated with the mold sections effects curing of the formed tire.

The present invention has for one of its main objects the provision of a tire curing press in which, in its open position, the space between the separated mold sections is unobstructed so that an uncured pulley band tire carcass may be loaded into the press without the necessity of first lifting the carcass over the tire shaping device as is now required in many tire curing presses and so that, in instances where the cured tire remains in the bottom mold section or is raised a short distance thereabove after opening of the press, the tire may be laterally removed, again without such lifting. In the present press, the tire will preferably be raised by the top mold section and the tire shaping device will be retracted from operative position so as to clear the space between the mold sections for a conveyor, platform, or the like onto which the tire is adapted to be discharged from the top mold section.

Another object of this invention is to provide a tire shaping device having a radially expansible side wall which is turned inside-out when retracted from its operating position between the mold sections.

Another object is to provide a tire shaping device which is of a simplified form with few moving parts, which is economical to manufacture, and which is so constructed that the same may be readily adjusted to accommodate different molds, platens, and other components of the press and that the radially expansible former is readily accessible for servicing or replacement.

Another object is to provide an invertile flexible former which has an open end through which the other end is moved in opposite directions to alternately position the flexible former within a pulley band tire carcass for shaping the latter and to withdraw the flexible former from the area within the carcass and from within the shaped tire.

Another object is to provide an invertile former as aforesaid in which alternate invagination thereof is effected by a reciprocating member connected to such other end.

Another object is to provide an invertile former as aforesaid in which alternate invagination thereof is effected respectively by fluid under pressure in a chamber of which said former constitutes a deformable wall, and a reciprocating member detachably connected to such other end.

Another object is to provide an invertile former as aforesaid in which alternate invagination thereof is effected by fluid under pressure admitted alternately in chambers on opposite sides of such other end.

Another object is to provide a novel arrangement for introduction and circulation of curing medium in the tire shaping flexible former.

Another object is to provide a novel clamp for the open end of said former which serves as a well into which and from which said former is alternately invaginated.

Another object is to provide an invertile flexible former which, in its tire shaping position, is approximately of tire shape between its ends, that is, of generally C-shape radial cross-section to minimize stress therein whereby the wall thickness can be appreciably thinner than when said former is originally of generally cylindrical shape and is ballooned and stretched to tire shape, such thinner wall further providing for more efficient heat transfer for the vulcanizing or curing of the shaped tire.

Other objects and advantages of the invention will become apparent as the following description proceeds.

To the accomplishment of the foregoing and related ends, the invention, then, comprises the features hereinafter fully described and particularly pointed out in the claims, the following description and the annexed drawings setting forth in detail several illustrative embodiments of the invention, these being indicative, however, of but a few of the various ways in which the principle of the invention may be employed.

Figure 13:
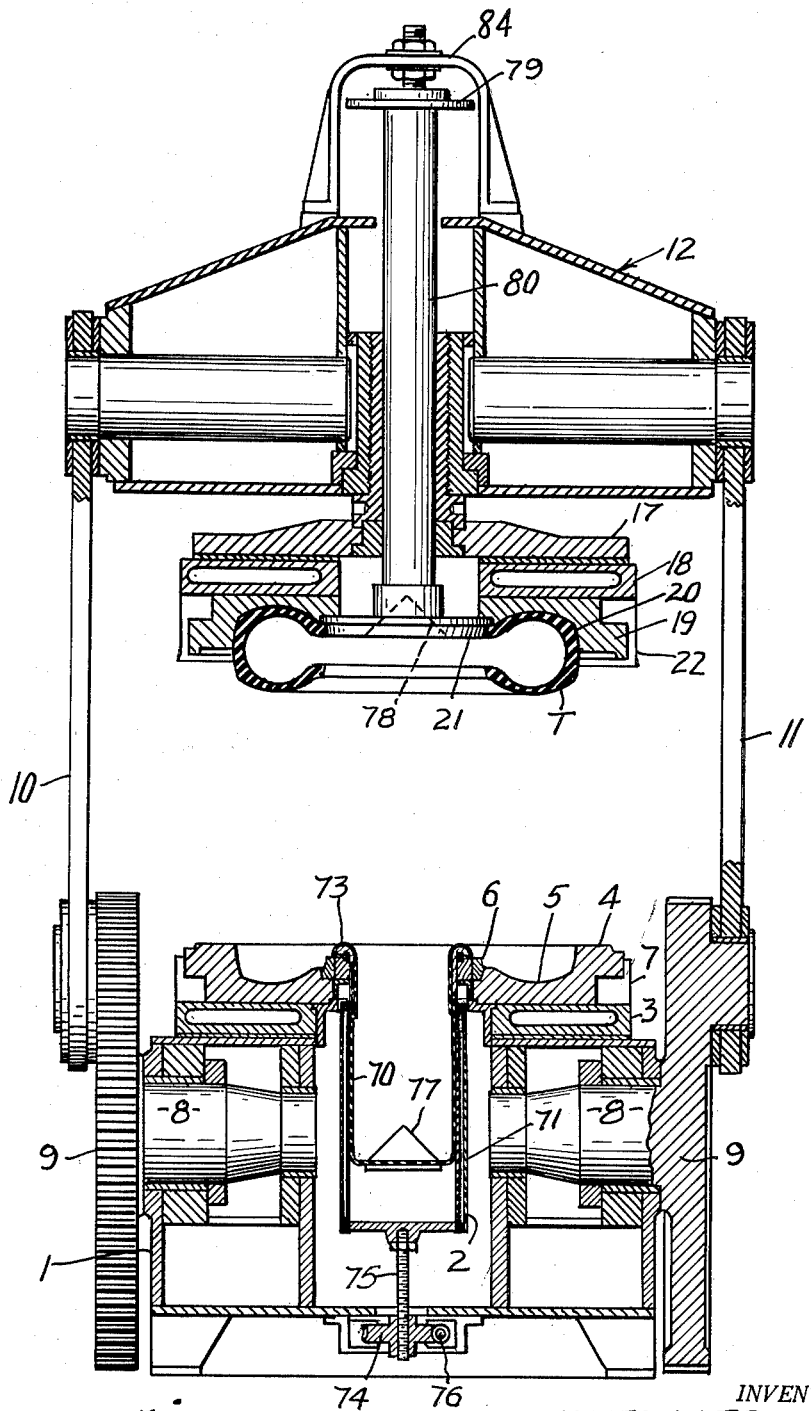
Fig. 13 is a cross-section view of a different form of the apparatus.
Figure 18:
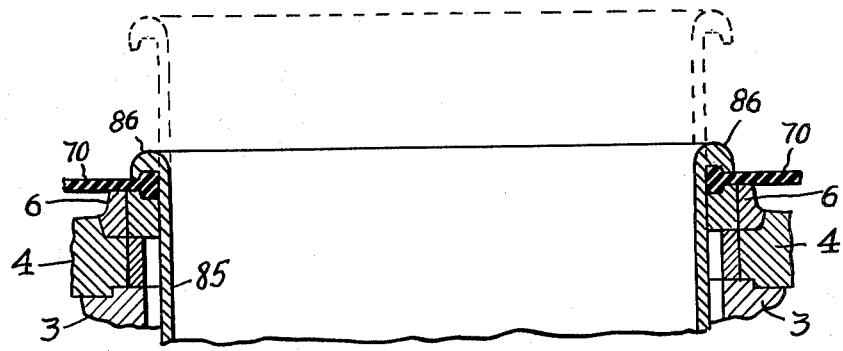
Figure 19:
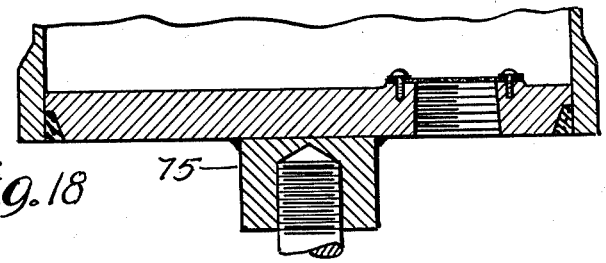
Figure 20:
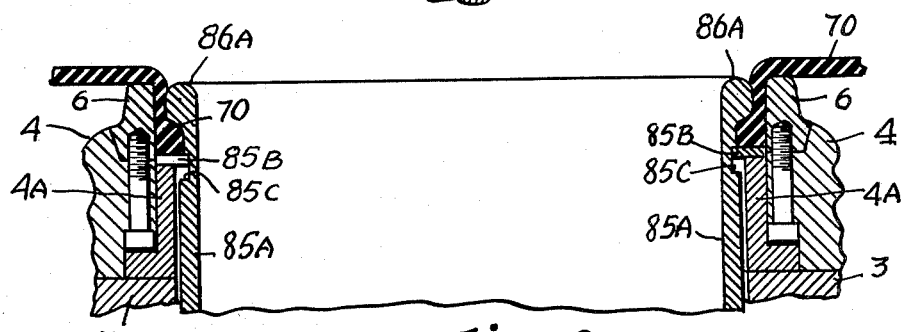
Figure 21:
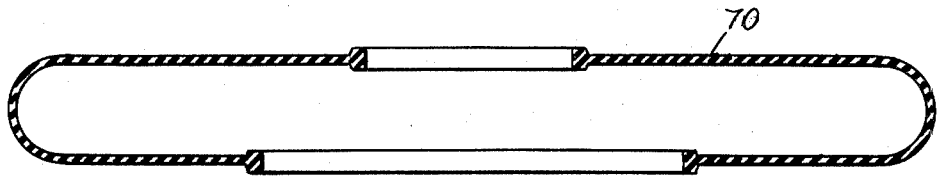
Figure 22:
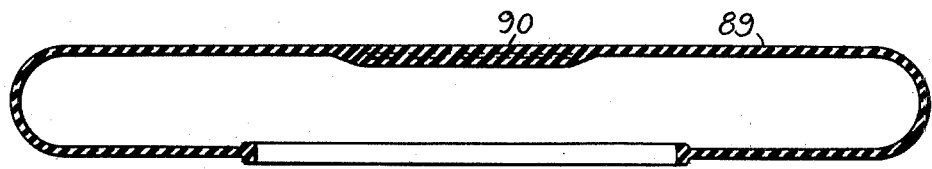

Figs. 14 and 15 respectively show in cross-section the top half and bottom half of the press of Fig. 13 in its closed position;

Fig. 16 is a side elevation view of the bottom portion of the Fig. 13 press to show the mechanism for actuating the flexible former clamping member;

Fig. 17 is a cross-section view of a modified form of former clamping member such as may be employed in the press of Fig. 13;

Fig. 18 is a cross-section view of still another form of clamping member;

Fig. 19 is a cross-section view of another clamping member;

Fig. 20 illustrates a modification in the upper end of the former;

Fig. 21 is a cross-section view of the preferred normal shape of a former;

Fig. 22 is a cross-section view of another form of former having reinforcing in its closed end;

Figs. 23 to 30 are diagrammatic views illustrating the relative positions of the Fig. 13 press parts during the operation thereof; and Figs. 31 to 33 are similar diagrammatic views showing a press employing fluid under pressure for pushing the flexible former downwardly to turn the same inside out.

Figure 1:
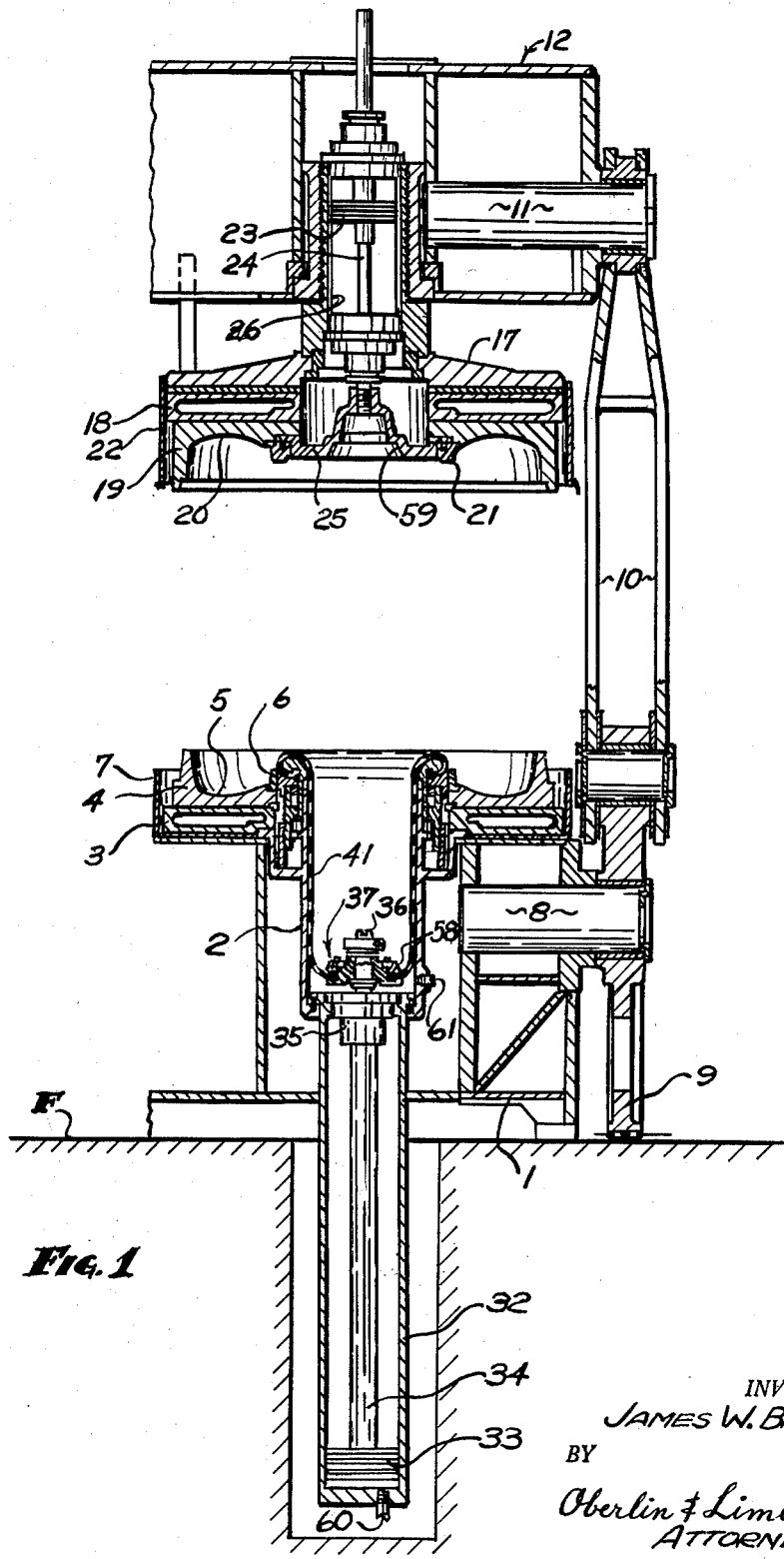
Fig. 1 is a vertical cross-section view of one shaping and curing unit of a multiple unit tire curing press embodying the present improvements, the press being in open position.
Figure 2:
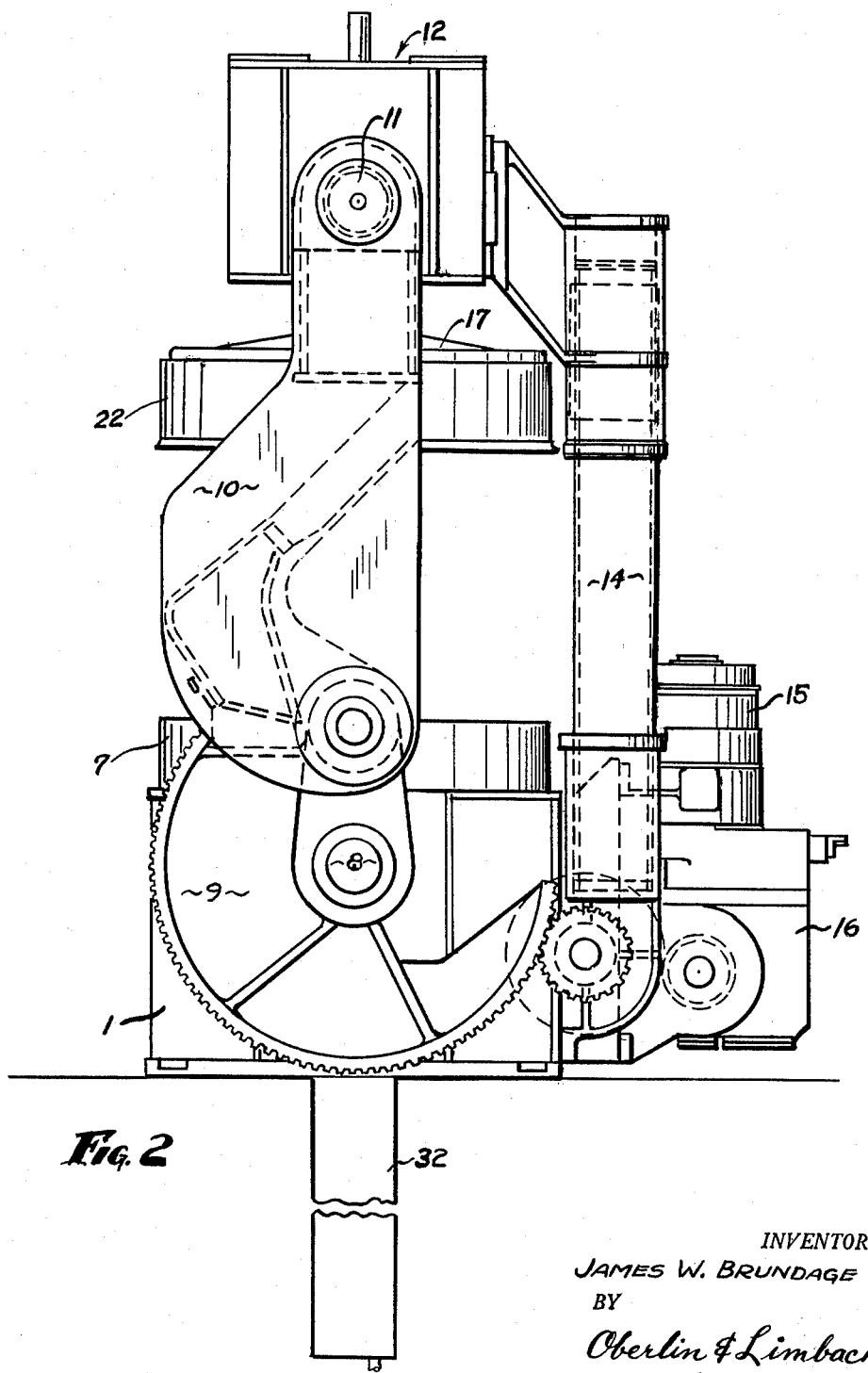
Fig. 2 is a side elevation view as viewed from the right-hand side of Fig. 1.

General press construction (Figs. 1 and 2)

Referring now more particularly to the drawings, and especially to Figs. 1 and 2 thereof, the tire curing press comprises a base 1 having an assembly 2 defining an upwardly opening cup-shaped recess around which is disposed a mold heating platen 3 having an upwardly facing bottom mold section 4 thereon which defines an annular molding surface 5 including a toe ring 6 around its inner marginal edge, said toe ring constituting a seat for the lower bead of a pulley-band tire carcass T which is adapted to be supported thereon. As shown, said mold section 4 encircles the mouth of the recess. Surrounding said mold section 4 and platen 3 is a heat shield 7.

As evident, said base 1, platen 3, and mold section 4 constitute the fixed part of the press.

Projecting laterally from each side of said base 1 is a shaft 8 on which is journalled a bull gear crank 9 with dual links 10 pivotally connected to said gear crank 9 and to a laterally projecting shaft 11 on each side of the movable press part or head 12. Inasmuch as the shaft 8, bull gear crank 9, dual links 10, and shaft 11 is duplicated on the left-hand side of the base next to another assembly 2, illustration of such left side of the press has been deemed unnecessary insofar as the present invention is concerned.

The upper movable press head 12 aforesaid is vertically slide-guided on a required number of posts 14 which project upwardly from the rear of base 1.

Vertical reciprocation of said upper movable press head 12 is effected as by means of the reversible electric drive motor 15 and gear reduction mechanism 16 through suitable gearing which, as shown, is operative to rotate said bull gear cranks 180° in opposite directions to raise and to lower said upper movable press head 12.

Said press head 12 has threaded thereinto an assembly 17 carrying a mold heating platen 18 and a top mold section 19 on its under side, the threaded connection between head 12 and assembly 17 enabling adjustment of the space between mold sections 4 and 19 when the press is fully open to equal the stroke of the bull gear crank 9. As shown, the top mold section 19 is provided with a molding surface 20 which is complementary with and faces the molding surface 5 of the bottom mold section 4, such surfaces 5 and 20 defining a cavity of tire shape when the mold sections are in closed mating engagement. The inner marginal edge of such molding surface 20 is defined by a toe ring or seat 21 which is adapted to engage the upper head of a pulley band tire carcass during the downward movement of said upper press head 12. A heat shield 22 encircles said platen 18 and mold section 19 and when the press is closed, said shield 22 co-operates with shield 7 to form a closed chamber around the platens and mold sections which reduces heat losses during the curing operation.

As shown, said toe ring 21 associated with said top mold section 19 is mounted for vertical reciprocation independently of said upper press head 12 and assembly 17, such reciprocation being effected as by means of the piston and cylinder assemblage of which the piston 23 is secured to a rod 24 which rod, in turn, is secured at its lower end through the intermediary of a bell-shaped member 25 to said toe ring 21 and is provided with two passages (not shown) leading from the top end into the cylinder 26 to the respective chambers on opposite sides of said piston, said cylinder 26 being formed in the threaded portion of assembly 17. As evident, admission of fluid under pressure into the cylinder chamber below piston 23 will hold the toe ring 21 in its uppermost position seated in the top mold section 19, and when fluid under pressure is admitted into the chamber in said cylinder above said piston (with the bottom chamber exhausted), said toe ring 21 will be shifted downwardly relative to said top mold section and thereby serve to discharge a cured tire which sticks to the top mold section onto a suitable platform or conveyor 27 (shown in dotted lines in Fig. 9) which is adapted to be inserted between the mold sections when the press is open and to be withdrawn before loading the next pulley band carcass in the press.

The operation of this tire stripping device which includes the aforesaid toe ring 21 as a part thereof will be described in further detail under the heading "Operation."

Figure 3:
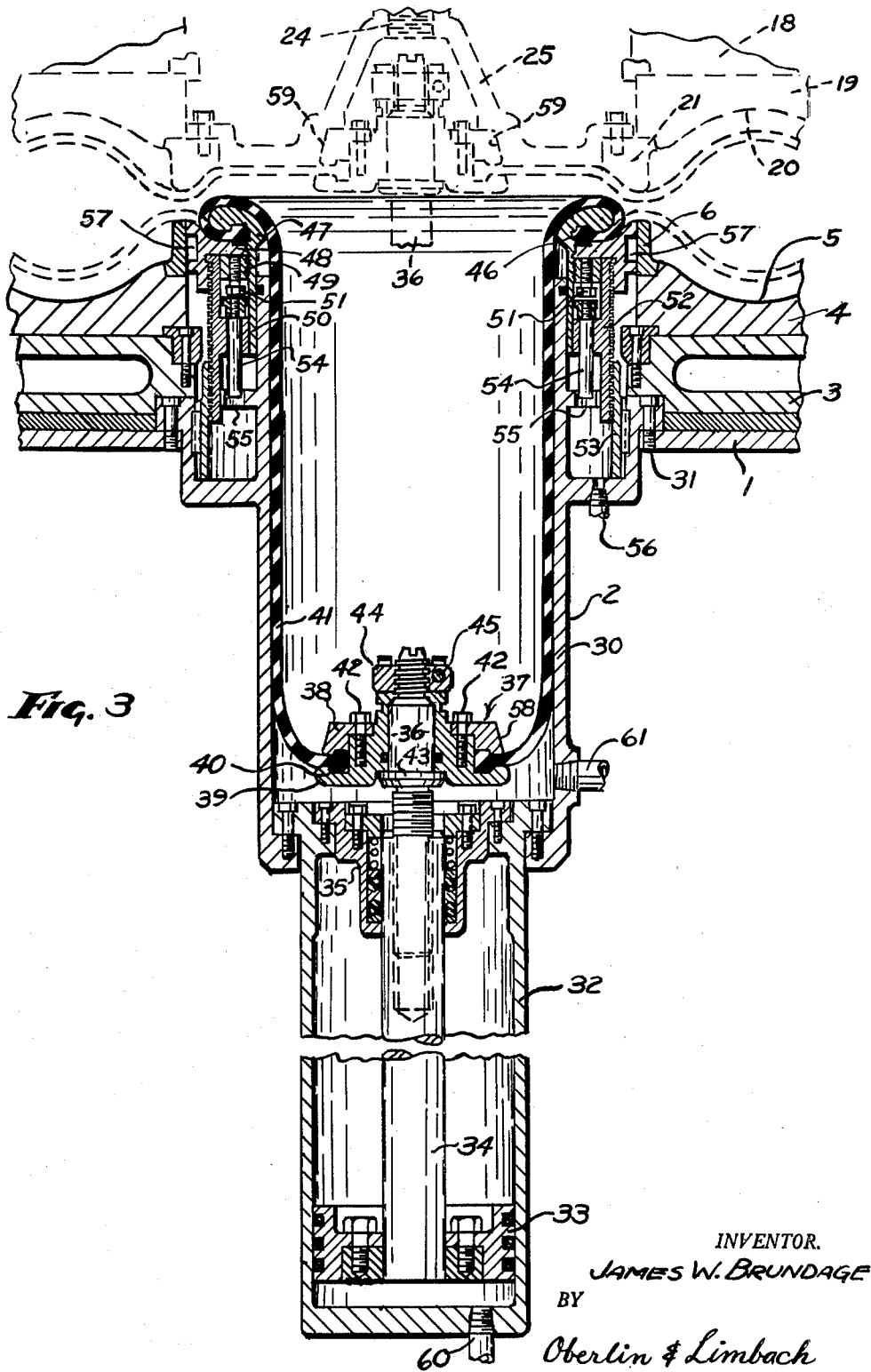
Fig. 3 is an enlarged cross-section view of the tire shaping device in its retracted position clearing the space between the mold sections of the press for facilitating loading and unloading of the latter and shown, in dotted lines, the positions of the parts when the press is closed.

Tire shaping device (Fig. 3)

Referring now to Fig. 3, the assembly 2 which forms an upwardly open recess in the base 1 of the press comprises a tubular member 30 which is secured to base 1 as by means of bolts 31 and which has secured thereto at its lower end a downwardly extending cylinder 32 which as shown in Fig. 1 extends into a well in the press-supporting floor F. Reciprocable in said cylinder 32 is a piston 33, the rod portion 34 of which extends through a packing gland assembly 35 at the bottom of said member 30 and at the top of said cylinder 32, and threaded into the upper end of said piston rod 34 is an adjusting post 36 rotatable within a head unit 37 which comprises complementary rings 38 and 39 clamping therebetween one beaded edge portion 40 of a generally cylindrical former 41, such clamping being effected as by means of a series of bolts 42 extending through ring 38 and threaded into ring 39. Said head unit 37 is rotatable on adjusting post 36 and is disposed between a collar portion 43 on said adjusting post 36 and a split collar 44 which is threaded onto the upper end of said adjusting post and therefore said head unit 37 is adjustable upwardly and downwardly by rotation of said adjusting post in piston rod 34. The split collar 44 is locked on post 36 against turning as by means of the bolt 45 across the split thereof which bolt when turned contracts said split collar on said post.

As shown, said former 41 extends upwardly from said head unit 37 and has its other inwardly turned beaded edge portion 46 clamped between complementary rings 47 and 48, preliminary clamping being effected as by nut 49 threaded on the tubular extension 50 of ring 47, and bearing on ring 48. Final clamping pressure is exerted through screws 51 which are threaded into nut 49 and bear on circumferentially spaced points around ring 48. Said former 41 is flared outwardly and its clamped edge portion 46 is turned inwardly as best shown in Fig. 3.

Threaded or otherwise secured to ring 48 is a threaded sleeve member 52 which extends downwardly from ring 48 and has threaded engagement with member 53, the latter being vertically slidably keyed in said cup-shaped assembly 2. Extending downwardly from said sleeve member 52 are one or more locking pins 54 which are each adapted to fit into one of a plurality of circumferentially spaced notches 55 around said member 52 to lock the entire former assembly including rings 47 and 48, former 41, and head unit 37 against rotation from a predetermined adjusted position whereat the upper surface of ring 48 is flush with the top surface of toe ring 6.

In order to adjust the relative positions of toe ring 6 and said ring 48 to accommodate mold sections 4 of different thicknesses, air or other fluid is admitted through port 56 to raise the clamping assembly above said toe ring 6 to provide access to the wrench-engaging recesses 57 formed around ring 48. With said clamping assembly thus elevated, it, together with former 41 and head unit 37, may be rotated relative to the non-rotatable member 53, the locking pins 54 then being disengaged from the notches 55 and upon making such adjustment, the fluid under pressure is released to permit the entire assembly to drop down to a flush position with the locking pins engaging in different notches.

The ring 38 of the head unit 37 is formed with a tapered exterior surface 58 which during operation of the press is adapted to be seated in a correspondingly tapered socket 59 in the stripper unit 25, 21 carried by the upper movable press head 12. Thus, the unit 37 is held centered with respect to the mold sections 4 and 19, during the tire shaping operation.

As is now evident, former 41 may be positioned so as to be telescoped within an uncured pulley band tire carcass T simply by admitting fluid under pressure through the port 60 in cylinder 32 to raise piston 33, piston rod 34, and head unit 37 to a position where the latter is disposed for engagement by the stripper unit during the downward movement of the upper press head 12. It is to be noted that such upward movement of said head unit 37 turns former 41 inside-out. During such upward movement, but preferably after, suitable heated curing medium under pressure may be admitted inside the former 41 through port 61.

Although but one form of actuator for the head unit 37 has been illustrated, it is to be understood that other equivalent means may be employed. For example, a rod or like member may be projected downwardly from the upper press head to grab the head unit and to pull the same upwardly to turn the former 41 inside-out and to position the same for shaping a pulley band tire carcass therearound. (See Fig. 5 in the Patent No. 2,559,119, granted to Paul A. Frank, under date of July 3, 1951.) Likewise, suitable linkage or equivalent mechanism may be associated with said head unit rather than the piston-cylinder assemblage herein illustrated, and in some instances it may be possible to make advantageous use of "lazy tongs" or the like to reduce the depth of or to entirely eliminate the necessity of a well in the floor F.

Operation of Fig. 1 press

The press herein disclosed may be operated in either of two ways, viz.:

(I) in the sequence shown in Figs. 1 and 4 to 9; or
(II) in the sequence shown in Figs. 1, 10 to 12, and 7 to 9.

(I) The first-mentioned manner of operation (Figs. 1 and 4 to 9) involves the following steps:

1. When the press is open as shown in Fig. 1, with the former 41 and head 37 thereof in cup-shaped form nested in the cup-shaped assembly 2, a pulley band tire carcass T may be laterally inserted between the top and bottom mold sections 19 and 4 and supported on the toe ring 6 which has been previously treated with an anti-sticking compound which causes the cured tire to preferentially stick in the top mold section 19.

Figure 4:
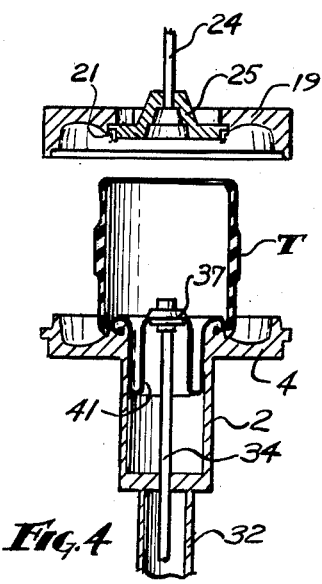
Figs. 4 to 12 are diagrammatic views illustrating the relative positions of the press parts during operation thereof.
Figure 5:
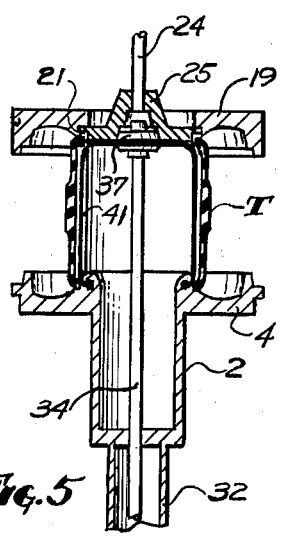

2. With the pulley band tire carcass T thus loaded in the press, fluid under pressure, preferably air, is admitted under the piston 33 to raise the head unit 37 so that the former 41 is positioned in telescoped relation within the pulley band tire carcass T, Fig. 5 showing the final telescoped position and Fig. 4 showing said head unit 37 in the course of its upward movement.

3. The drive motor 15 is then energized to cause the bull gear cranks 9 to rotate in a direction to lower the upper press head 12, such movement causing engagement between the stripper member 25 and said head unit 37 and also preferably simultaneously causing engagement of stripper toe ring 21 with the upper bead of the pulley band tire carcass T. (See Fig. 5.)

Figure 6:
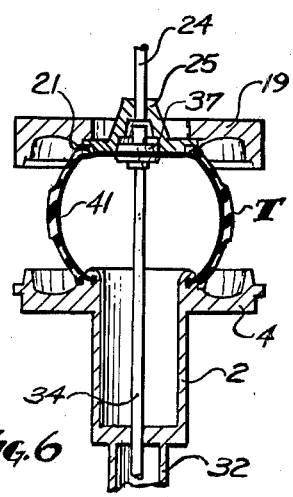

4. Heated curing medium under pressure is then admitted into the tire shaping device and as the upper press head continues to move downwardly, the beads of the carcass T are moved toward each other and the former 41 expands radially to bulge the carcass as shown in Fig. 6.

Figure 7:
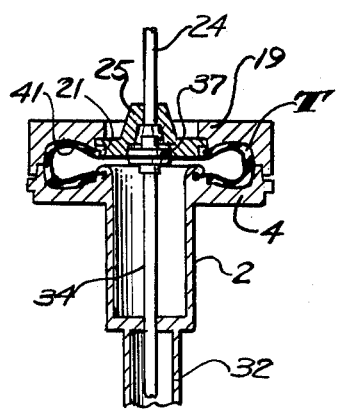

5. Finally, when the press has closed as shown in Fig. 7, the carcass T has been deformed to tire shape and is held in such shape, engaging the molding surfaces of mold sections 4 and 19 by pressure exerted by former 41, for a requisite time to effect curing of the carcass T into tire shape.

6. After the cure, the direction of the drive motor 15 is reversed to rotate the bull gear cranks 9 in an opposite direction to raise the upper press head 12 and if air pressure is maintained under the piston 33 to provide, in effect, an air spring, and if pressure exists in the tire shaping device, said head unit 37 will move upwardly with said press head 12 to cause breaking of the tread portion and opposite side walls of the finished tire from the respective mold sections 4 and 19 owing to separation of the bead portions thereof.

Figure 8:
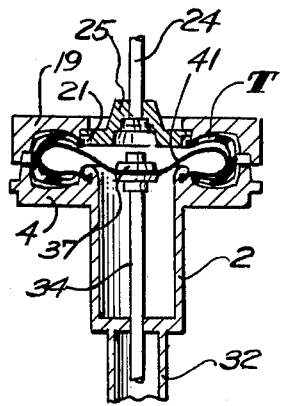

7. As pressure is released under the piston 33 and applied to the top thereof, if desired, and when the tire shaping device is evacuated, the head unit 37 will be drawn downwardly to strip former 41 from the interior wall of the finished tire as shown in Fig. 8. Because of preliminarily coating of the surface of toe ring 6 with a suitable anti-sticking compound, the lower bead of the finished tire T will slip away from said toe ring whereby when the press is opened as in Fig. 9, the tire T will have been lifted with said press head 12.

Figure 9:
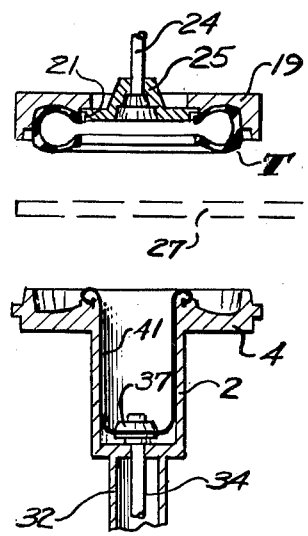

8. With the shaping device now retracted in the cup-shaped assembly 2 and inverted therein, the space between the mold sections 4 and 19 is again unobstructed whereby a suitable conveyor or platform 27 may be inserted therebetween to catch the tire T upon stripping thereof from said toe ring 21 and from the upper mold section 19 by actuation of the piston 23 which moves said toe ring 21 and stripper member 25 downwardly with respect to the top mold section 19. In Fig. 9, the finished tire is shown stuck to the upper press head 12 and ready for discharge onto a conveyor or platform 27.

9. The conveyor 27 is then removed from the space between the mold sections 4 and 19 and with the press in the position of Fig. 1, the next uncured pulley band carcass T may be loaded onto the press.

Figure 10:
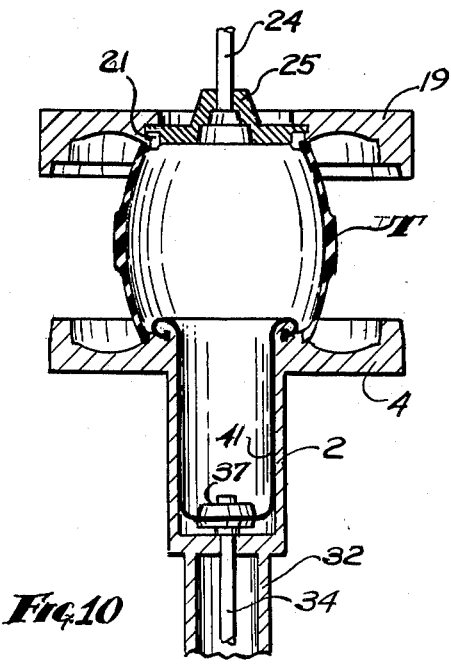

(II) The second way of operating the press as shown in Figs. 1, 10 to 12, and 7 to 9 differs only in the following intermediate steps (Figs. 10, 11, and 12) which replace those depicted in Figs. 4 to 6:

1. As shown in Fig. 10, the pulley band tire carcass T has been partly bulged primarily by endwise pressure applied on the beads thereof by the toe rings 6 and 21, compressing trapped air in the carcass, during the downward movement of the upper press head 12.

Figure 11:
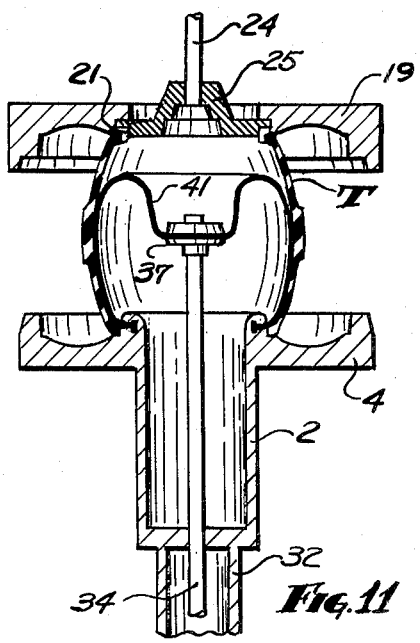

2. After the carcass T has thus been partly bulged, fluid under pressure is admitted under the piston 33 to raise the same and curing medium under pressure is simultaneously admitted into the tire shaping device to cause the former 41 to be progressively laid against the interior wall of the carcass T as shown in Fig. 11 starting from the lower bead and progressively approaching to the upper bead to finally exert pressure against the entire interior wall of the carcass.

Figure 12:
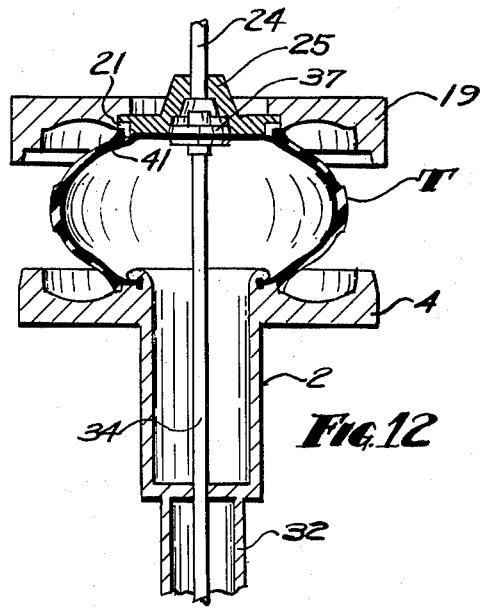

3. Fig. 12 shows the former 41 in full operating position with the head unit 37 seated in the socket of the stripper member 25.

As previously mentioned, the preceding and following steps are the same as shown in Figs. 1 and 7 to 9 respectively, and therefore, repetition of the description and illustration thereof has been deemed unnecessary.

In summary, therefore, it can be seen that the present improvements provide an extremely simple form of tire shaping device which has but a few moving parts.

Another important feature of this invention resulting from inverting of the former 41 is that deterioration of the interior wall thereof to a gummy or tacky condition does not entail cleaning or replacement of any of the moving parts of the shaping device since such wall does not come into contact with any such moving parts as do the interior walls of known tire shaping devices. In the present case, the interior wall of former 41, which is exposed to the curing medium, becomes the exterior wall when the former is turned inside-out and retracted from operating position and such exterior wall cannot contact any moving parts since only the cup-shaped member 30 which has no moving parts is disposed thereabout.

The foregoing operations have been described as occurring in a predetermined sequence, but it is to be understood that the sequence may be varied, and it is further to be understood that, while no specific electric and fluid control units or timers have been illustrated, these may be readily provided by those skilled in the art to achieve automatic operation of the press and associated equipment such as the conveyor platform 27. Also, if desired, the cured tire T may remain in the bottom mold section 4 upon opening of the press or raised therefrom and removed laterally from the space between the separated mold sections 4 and 19, the former 41 having been retracted from operating position and retracted into the recess-defining assembly 2.

In the case of "shoulder-built" truck tires wherein dual bead rings are disposed in the opposite edges of the carcass, the extra thickness of the plies renders the inside diameter of the edges of the carcass smaller than the external diameter of the toe rings 6 and 21 or of the cylindrical rim on which the finished tire is to be mounted, and therefore difficulty has been experienced heretofore in the proper seating of the carcass on such cylindrical toe rings. Also, the extra thickness of the plies results in sponginess of the bead portions. In the present form of press, the toe rings 6 and 21 are clearly visible from the side of the press during the seating of the bead portions; and this, in combination with the simultaneous application of radial shaping pressure and axial seating pressure as shown in Figs. 6 and 11, for example, which tightens the plies around the dual bead rings to enlarge such inside diameter to fit over the toe rings, reduces spoilage to a minimum. If, as the shaping and seating operation progresses, the bead portions of the truck tire carcass do not properly seat on the toe rings, the press may be immediately stopped and proper adjustment made, this effecting a considerable saving because of the relatively high cost of building the truck tire carcasses. In the case of passenger car tires which are designed to fit tapered seats on the conventional drop-center rims, there is no problem of seating as aforesaid because the toe rings are correspondingly tapered and the fewer plies are more tightly wrapped around single bead rings, resulting in more accurate inside diameters of the bead portions for slipping into seated position on said tapered toe rings.

As previously mentioned, the use of air under pressure under piston 33 to raise the head unit 37 and the maintenance of such air pressure during the shaping operation provides an "air spring" which, together with the pressure of the fluid inside former 41, maintains a yieldable contact between said head unit and the press head 12. The piston 33-cylinder 32 assemblage is preferably of the single-acting type whereby, even though air pressure to some degree remains in effect under piston 33, the evacuation of the former 41 and the effect of negative pressure therein will cause the head unit 37 to be drawn downwardly and the air cushion under piston 33 will eliminate shock as the head unit reaches its bottom position.

*General press construction (Figs. 13 to 17)*

Referring now to the press illustrated in Figs. 13 to 17, the press as a whole is generally similar to that illustrated in Figs. 1 and 2; and, therefore, the same reference numerals have been used to designate the same or similar parts as follows:

1—Base
2—Diaphragm well and clamping assembly
3—Bottom platen
4—Bottom mold section
5—Molding surface of bottom mold section
6—Bottom toe ring
7—Bottom heat shield
8—Shaft on base
9—Bull gear crank
10—Link
11—Link
12—Top press head
17—Top mold supporting assembly
18—Top platen
19—Top molding section
20—Molding surface of top mold section
21—Top toe ring
22—Top heat shield
24—Piston rods for ejection
25—Bell-shaped ejector head
26—Cylinders for ejection
27—Platform to catch cured tire T

*Tire shaping device (Figs. 13 to 22)*

One principal difference in the Fig. 1 and 13 presses resides in the maner of effecting invagination or turning inside out of the invertile tire shaping member or former 70. In Figs. 13 to 17, instead of pushing the closed end of the shaping assembly upwardly through the open end and then pulling said closed end downwardly through said open end by means of a piston 33 reciprocable in cylinder 32, it is contemplated in Figs. 13 to 17 to employ fluid under pressure in the former well and clamping member 71 to turn the former inside out at the beginning of the press operation and then to employ a push rod 72 to engage and to push down the top closed end of the former at the conclusion of the press operation to invaginate the former into said member 71.

In the form of the invention shown in Figs. 13 to 17, the well and clamping member 71 has an outwardly extending flange 73 at its upper end for clamping the beaded edge of the former 70 against a complementary seat provided around the inner periphery of the bottom toe or bead ring 6. Said clamping member 71 is tubular in form as shown, and has a closed bottom end and is adapted to be raised or lowered to unclamp and clamp the beaded edge of the former 70 by means of the worm wheel 74 which has threaded engagement with a stud 75 projecting downwardly from the bottom of said clamping member and which is itself fixed in base 1 against axial movement, said worm wheel 74 being rotated as by means of a worm shaft 76 which is journalled in the base of the press and which projects to the front of the press for ready access.

The clamping member 71 may be of double-wall structure, as shown, whereby fluid under pressure, that is, the curing medium such as hot water or steam, is conducted upwardly between the spaced walls and is directed by the radially disposed passages in flange 73 so as to circulate in the portion of the former which is engaged within the shaped tire T and the spent fluid is drained through the passage at the bottom of said clamping member.

As shown in Figs. 13, 14, and 15, the former 70 has secured thereto at its other beaded edge a conical projection 77 which fits into a corresponding conical recess 78 of an upper bead ring assembly, the bead ring 21 and member 25 of which is downwardly movable relative to the top mold section 19 as by means of the fluid cylinders 26 which have their piston rods 24 connected to the cross-head 79 at the top of the tubular extension 80 of member 25.

The conical recess 78 is also defined in part in the aforesaid vertically reciprocable push rod 72 which, as best shown in Fig. 14, is in the form of a cylinder recipocable with respect to a fixed piston 82, the piston rod 83 of which is provided with passages to conduct fluid under pressure to either side of said piston 82 in order to raise and to lower said push rod. The upper end of said piston rod 83 is threaded into a yoke 84 for vertical adjustment of said rod 82 to determine the upper limit of push rod 72 so that its conical recess portion 78 coincides with the portion of the conical recess in said upper bead ring assembly.

As will be explained in greater detail with reference to the operation of this press, when the space within the former 70 is evacuated or pressure therein is released, the downward movement of said push rod 72 will push the upper end of the former 70 downwardly through the open end thereof to thereby invaginate or withdraw the same from within the cured tire T and at the same time to push the same into the well and clamping member 71 so that it does not project above the bottom mold section 4. After the former 70 has been thus inverted, the push rod 72 will be raised to the position shown in Fig. 14 whereupon the press may be completely opened; and with the tire T stuck in the top mold section 19, the cylinders 26 may be actuated to push the member 25 and the top bead ring downwardly to strip the tire T from the top mold section for catching onto a suitable platform which is adapted to be inserted between the top and bottom mold sections 4 and 19 when the press is open.

Fig. 18 shows a modified form of well and clamping member 85; and when said clamping member 85 is in its raised position, as shown in dotted lines, the former 70 may be readily removed therefrom and a new former may be buttoned over the flange 86 around the periphery of the mouth of said clamping member whereupon the movement of the clamping member downwardly will cause the beaded edge of said former to be clamped between said flange 86 and a seat provided around the inner periphery of the bottom bead ring 21.

The Fig. 19 clamp member 85A has a split ring 85B therearound against which the flange 86A presses the beaded edge of former 70. A ring 4A associated with mold section 4 serves as a stop for ring 85B and when clamp member 85A is raised, the shoulder 85C thereof moves ring 85B upwardly to thereby force the beaded edge of former 70 out of the bead ring 6.

In Fig. 20 there is shown a modified form of head 87 and push rod 88, said head having a conical recess into which the conical end of the push rod fits for centering the former 70 with respect to the top and bottom mold sections 4 and 19. In this case, the push rod 88 may be connected directly to a piston (not shown) which is reciprocable in a cylinder (not shown) attached to the press head 12.

In Fig. 21 is shown the preferred normal shape of the former 70 which is used in the press of Fig. 13, for example, it having been found desirable to mold said former to approximately tire shape to minimize the extent of stretching or deformation thereof during the shaping and curing operation. A former thus shaped as shown in Fig. 21, can be made of rubber or rubber-like material which is considerably thinner than otherwise required if originally made in cylindrical shape and then swelled to tire shape. Moreover, the thinness of the wall of former 70 makes possible greater heat transfer from the curing medium to the inside wall of the shaped tire T.

Fig. 22 shows another former 89 of shape similar to that in Fig. 21, and here the former itself is formed with a closed end having reinforcing 90 therein. Such closed end may have a conical projection or a conical recess to co-operate with a push rod 72 or 88 as in Figs. 14 or 20 for centering the upper end of the former 89. The reinforcing 90 may be spun fiberglass, fabric, metal, or the like, to impart rigidity thereto.

*Operation of Fig. 13 press*

Figure 23:
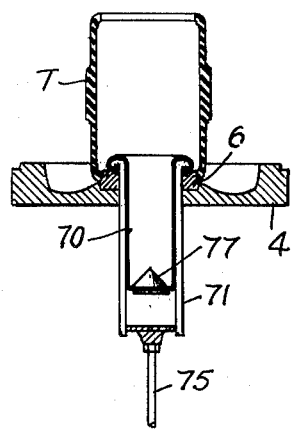
Figure 24:
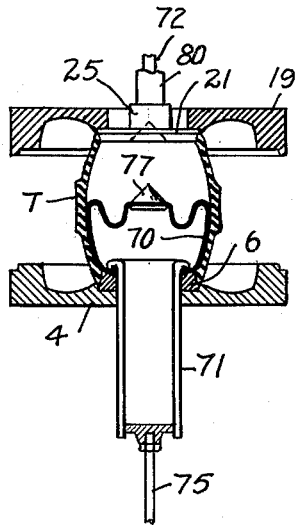
Figure 25:
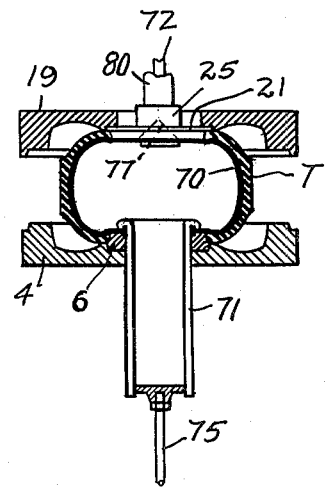

In Figs. 23 to 30 are shown the following successive steps in the operation of the Fig. 13 press:

(1) In Fig. 23 the press is shown in its open position with the former 70 disposed in the well of clamping member 71 and with a pulley band tire carcass T seated on the bottom toe ring 6;

(2) In Fig. 24 the top press head 12 has moved down to engage the top bead ring 21 with the top bead of the pulley band tire carcass T, and fluid under pressure has been admitted into the clamping member 71 to force the closed end of the former 70 upwardly into telescoped relation within the pulley band carcass, which carcass may, at this stage, be slightly swelled by end pressure on the beads thereof. Fig. 24 shows how the former 70 is progressively laid against the inside surface of the carcass T;

(3) In Fig. 25 the complementary conical portions of the former 70 and of the member 25 of the top bead ring assembly are in engagement, thus centering the former 70; and the upper press head 12 has continued to move downwardly. At this stage, the fluid under pressure within the former 70 can be increased so as to effect further and progressive swelling of the carcass T conjointly with the swelling caused by movement of the beads thereof toward each other;

(4) Fig. 26 shows the press in its closed position in which curing medium such as steam or hot water is circulated under pressure through the diaphragm 70;

(5) After the shaped tire T has been cured by circulation of curing medium for the required length of time, the press is opened, as in Fig. 27, a slight amount, 2" for example, so as to separate the beads enough to facilitate the withdrawal of the former 70 from therewithin. For so invaginating or withdrawing the former 70, the pressure therewithin is released and, if desired, a vacuum may be applied, and the push rod 72 is actuated downwardly to push the closed end of the former 70 downwardly through the open end to invert the same. During the inversion of the former as aforesaid, the same is progressively peeled from the inside surface of the shaped and cured tire T;

(6) In Fig. 28 the former 70 is shown as being fully inverted into the well of clamping member 71 after which the push rod 72 may be raised and the press fully opened;

(7) Fig. 29 shows the press fully open with the cured tire T stuck in the top mold section 19, this being accomplished by spraying or otherwise coating the molding surface 5 of the bottom mold section 4 with a suitable anti-sticking compound before starting the press; and (8) Fig. 30 shows the top bead ring 21 actuated downwardly with respect to the top mold section 19 so as to strip the tire T therefrom whereupon it falls and is caught by a platform 91 which has in the meantime been inserted between the mold sections 4 and 19. The movement of the platform away from in-between the mold sections 4 and 19 carries the tire T away so that the next uncured pulley band carcass may be positioned as in Fig. 23. If desired, the top bead ring 21 may be left in its lowered position as shown in Fig. 30 because this affords an excellent opportunity for viewing the progress of the seating of the top bead of the tire and should such seating progress improperly, the press may be immediately stopped thereby to avoid spoilage.

*Structure and operation of modified press utilizing fluid under pressure for invaginating the former*

In the press shown in Figs. 31 to 33, the top, movable bead ring assembly 92 has a fluid pressure connection 93 effective to force the top closed end of the former 94 downwardly into well 95 as shown in Figs. 32 and 33, to thus withdraw the former 94 from within the cured tire T. Fig. 33 corresponds generally with Fig. 30 in that the cured tire T has been ejected from the top mold section 19 by the lowering of the top bead assembly 92 relative to said top mold section.

With reference to the top bead ring assemblies herein disclosed, attention is directed to my co-pending application, Serial No. 354,451, filed May 12, 1953, which shows a top bead ring assembly which is retractable with respect to the top mold section so as to withdraw the bead or toe ring from within the bead of the cured tire; and in this way eject the tire after it has been freed from the top mold section. This is especially desirable in the case of truck and like heavy-duty, large-size tires which are provided with dual beads and which have cylindrical inner bead surfaces which tend to stick on the corresponding bead ring seats therefor.

The present application is a continuation-in-part of my co-pending application, Serial No. 261,488, filed December 13, 1951, now abandoned.

Other modes of applying the principle of the invention may be employed, change being made as regards the details described, provided the features stated in any of the following claims, or the equivalent of such, be employed.

I therefore particularly point out and distinctly claim as my invention:

1. A tire curing press comprising a pair of complementary mold sections between which an uncured tire carcass is adapted to be positioned and means for relatively moving said mold sections to mating engagement whereat they define a cavity of tire shape therebetween, a radially expansible diaphragm having a head secured at one end thereof which has detachable engagement with one mold section, said diaphragm extending between said mold sections and disposed within such tire carcass to deform the latter to tire shape during relative movement of said mold sections to mating engagement, and means effective to move said head through the other end of said diaphragm and through the other mold section for turning said diaphragm inside-out for withdrawing the same from between said mold sections and out of the shaped carcass.

2. A tire curing press comprising a pair of complementary mold sections between which an uncured tire carcass is adapted to be positioned and means for relatively moving said mold sections to mating engagement whereat they define a cavity of tire shape therebetween, a radially expansible diaphragm having a closed end and an open end and an elastic side wall extending between said mold sections and disposed within such tire carcass to deform the latter to tire shape during relative movement of said mold sections to mating engagement, and means acting on such closed end for turning said diaphragm inside-out for withdrawing such side wall from between said mold sections and out of the shaped carcass.

3. A tire curing press comprising a pair of complementary mold sections and means for relatively moving said mold sections to mating engagement whereat they define a cavity of tire shape therebetween, seats adapted to engage the beads of a tire carcass to move such beads toward each other during movement of said mold sections to mating engagement, a radially expansible diaphragm extending between said mold sections and disposed to exert an expanding effect on said tire carcass during curing of the tire carcass in said mold cavity, and means for turning said diaphragm inside-out for withdrawing the same from between said mold sections and one of the shaped carcass.

4. A tire curing press comprising a pair of complementary mold sections and means for relatively moving said mold sections to mating engagement whereat they define a cavity of tire shape therebetween, seats adapted to engage the beads of a tire carcass to move such beads toward each other during movement of said mold sections to mating engagement, a radially expansible diaphragm extending between said mold sections and disposed to deform the carcass to tire shape during relative movement of said mold sections to mating engagement, and means for turning said diaphragm inside-out for withdrawing the same from between said mold sections and out of the shaped carcass.

5. A press according to claim 4 characterized further in that there is a head secured at one end of said diaphragm which has detachable engagement with one mold section, and said last-named means is effective to move said head through the other end of said diaphragm and through the other mold section to thus turn said diaphragm inside-out and to withdraw said diaphragm from between said mold sections.

6. A press according to claim 4 characterized further in that a cup-shaped unit is secured at its open end to one end of said diaphragm for receiving said diaphragm therein when turned inside-out and withdrawn as aforesaid.

7. A press according to claim 5 characterized further in that said means for turning said diaphragm inside-out comprises a reciprocable member attached to said head and extending through said diaphragm when the latter is disposed between said mold sections.

8. A press according to claim 6 characterized further in that said diaphragm and unit form a chamber for fluid under pressure to cause radial expansion of said diaphragm and corresponding deformation of the tire carcass.

9. A tire curing press comprising a fixed lower press part formed with an upwardly open recess, a bottom upwardly facing mold section encircling the mouth of such recess, means providing a seat adapted to support a tire carcass in pulley-band form in upright position extending upwardly from the inner marginal edge of the molding surface of said bottom mold section, a downwardly movable upper press part, a top downwardly facing mold section having a molding surface which, together with the molding surface of said bottom mold section, defines a cavity of tire shape when said mold sections are in mating engagement, means providing a seat adapted to engage the upper edge of the tire carcass and to move the upper and lower edges of the tire carcass toward each other during downward movement of said upper press part and top mold section, a cup-shaped diaphragm unit in such recess having its mouth secured to the mouth of such recess and having a radially expansible side wall, means for inverting said unit to position the side wall thereof between said mold sections whereby upon radial expansion thereof and downward movement of said upper press part and top mold section the tire carcass is similarly deformed into tire shape between said mold sections.

10. A press according to claim 9 characterized further in that said unit has a head which, when said unit is in inverted position, is engaged by said upper press part.

11. A press according to claim 10 characterized further in that a rod is secured to said head and extends downwardly through such recess, and means are provided for vertically reciprocating said rod to invert said unit as aforesaid.

12. A press according to claim 9 characterized further in that said unit is vertically adjustable to predeterminedly position the mouth thereof relative to such seat for the lower edge of the tire carcass and the molding surface of said bottom mold section.

13. A press according to claim 12 characterized further in that a member seated in said lower press part has threaded engagement with said unit whereby relative rotation of said member and unit effects vertical adjustment as aforesaid.

14. A press according to claim 13 characterized further in that said member and unit constitute a piston, a cylinder therefor into which fluid under pressure is adapted to be admitted to raise said member and unit to expose said unit and member for exterior access above the seat for the lower edge of the tire carcass to facilitate such adjustment.

15. A tire curing press comprising a pair of complementary mold sections between which an uncured tire carcass is adapted to be positioned and means for relatively moving said mold sections to mating engagement whereat they define a cavity of tire shape therebetween, a radially expansible diaphragm extending between said mold sections and disposed within such tire carcass to deform the latter to tire shape during relative movement of said mold sections to mating engagement, means for turning said diaphragm inside-out for withdrawing the same from between said mold sections and out of the shaped carcass, and a cup-shaped unit secured at its open end to one end of said diaphragm for receiving the latter therein when turned inside-out and withdrawn as aforesaid, said diaphragm and unit defining a chamber for fluid under pressure to cause radial expansion of said diaphragm and corresponding deformation of the tire carcass.

16. A tire curing press comprising a pair of complementary mold sections between which an uncured tire carcass is adapted to be positioned and means for relatively moving said mold sections to mating engagement whereat they define a cavity of tire shape therebetween, a radially expansible diaphragm extending between said mold sections and disposed within such tire carcass to deform the latter to tire shape during relative movement of said mold sections to mating engagement, means for turning said diaphragm inside-out for withdrawing the same from between said mold sections and out of the shaped carcass, and a cup-shaped unit secured at its open end to one end of said diaphragm for receiving said diaphragm therein when turned inside-out and withdrawn as aforesaid.

17. A tire curing press comprising a pair of complementary mold sections between which an uncured tire carcass is adapted to be positioned and means for relatively moving said mold sections to mating engagement whereat they define a cavity of tire shape therebetween, a radially expansible diaphragm having a head secured at one end thereof which has detachable engagement with one mold section, said diaphragm extending between said mold sections and disposed within such tire carcass to deform the latter to tire shape during relative movement of said mold sections to mating engagement, and a reciprocable member attached to said head and extending through said diaphragm when the latter is disposed between said mold sections, said reciprocable member being effective to move said head through the other end of said diaphragm and through the other mold section for turning said diaphragm inside-out for withdrawing the same from between said mold sections and out of the shaped carcass.

18. A tire curing press comprising a pair of complementary annular mold sections and means for relatively moving said mold sections to mating engagement whereat they define a cavity of tire shape therebetween, said mold sections being adapted to engage the beads of a tire carcass to move such beads toward each other during movement of said mold sections to mating engagement, a generally cup-shaped tire shaping device extending between said mold sections and having its mouth secured around the inner periphery of one mold section and having an elastic side wall disposed to exert an expanding effect on said tire carcass during curing of the tire carcass, and means, acting on the closed end of said device, to turn said device inside-out by moving such closed end through said one mold section and through the mouth of said device, thereby withdrawing said device from between said mold sections and out of the shaped carcass.

19. A tire curing press comprising a pair of complementary annular mold sections and means for relatively moving said mold sections to mating engagement whereat they define a cavity of tire shape therebetween, said mold sections being adapted to engage the beads of a tire carcass to move such beads toward each other during movement of said mold sections to mating engagement, a generally cup-shaped tire shaping device extending between said mold sections and having its mouth secured around the inner periphery of one mold section and having an elastic side wall disposed to deform the carcass to tire shape during relative movement of said mold sections to mating engagement, and means, acting on the closed end of said device, to turn said device inside-out by moving such closed end through said one mold section and through the mouth of said device, thereby withdrawing said device from between said mold sections and out of the shaped carcass.

20. A tire curing press comprising a pair of complementary mold sections and means for relatively moving said mold sections to mating engagement whereat they define a cavity of tire shape therebetween, seats adapted to engage the beads of a tire carcass to move such beads toward each other during movement of said mold sections to mating engagement, a generally tubular flexible diaphragm having opposite open and closed ends, and a side wall adapted to contact the inner surface of the tire carcass when said mold sections are moved to mating engagement, said open end being secured in fixed sealing engagement about a well associated with one of said mold sections, and said diaphragm being adapted to be moved into said well and thus at least partially turned inside-out, and means for thus turning said diaphragm inside-out for at least partially withdrawing the same from between said mold sections and out of the tire carcass therearound.

21. The tire curing press of claim 20 wherein a clamping mechanism comprising opposed relatively movable members is effective to clamp said open end of said diaphragm between said members in fixed sealing engagement about said well.

22. The tire curing press of claim 21 wherein said open end of said diaphragm is turned inwardly for buttoning over one of said members to a position between said members.

23. The tire curing press of claim 22 wherein said one member is of smoothly rounded radial cross-section around which the portion of said diaphragm adjacent the open end contacts when moved into said well.

24. The tire curing press of claim 22 wherein said well has a smoothly rounded mouth for contact with said diaphragm as the latter moves into said well.

25. A tire shaping device for use with a tire curing press comprising a ring, a disc-like member smaller than said ring capable of movement through the latter from one side to the other, a radially expansible tubular diaphragm having its opposite ends secured to said ring and member respectively and adapted to be turned inside-out upon movement of said member through said ring from one side to the other of the latter, and a seat for one bead of a tire carcass surrounding said ring and said diaphragm being positioned within or without such carcass according to the position of said member relative to said ring.

26. The press of claim 1 characterized further in that said means for turning said diaphragm inside-out is operative to peel said diaphragm from the inside of the shaped tire, and in that means, defining a fluid pressure chamber in which fluid under pressure acts upon said diaphragm, is effective to turn said diaphragm outside-in, and to exert radial expansive force to deform the carcass as aforesaid.

27. The press of claim 1 characterized further in that said means for turning said diaphragm inside-out comprises a movable plunger detachably engaging said diaphragm.

28. The press of claim 27 characterized further in that said plunger and said diaphragm are formed with complementary interfitting projection and recess portions effective to center said diaphragm with respect to said mold sections.

29. The press of claim 28 characterized further in that such interfitting projection and recess portions are of generally conical form.

30. The press of claim 29 characterized further in that said plunger is formed with the conical recess.

31. The press of claim 1 further characterized in that said diaphragm is of generally tubular form with an open end and a closed end, and in that support means are provided for said device which comprise a well-like clamp member over which the open end of said diaphragm is buttoned and into which a substantial portion of said diaphragm is adapted to be invaginated to withdraw the same from between said mold sections and from such carcass, a cooperating member against which such open end is pressed and thus clamped by said clamp member, and means for moving said clamp member toward and away from said cooperating member to clamp and unclamp the open end of said diaphragm therebetween.

32. The combination according to claim 31 characterized further in that said clamp member constitutes a cylinder provided with a port for admission of fluid under pressure which acts on the closed end of said diaphragm to force the closed end through the open end from one side of the latter to the other side.

33. The combination according to claim 31 characterized further in that said last-named means comprises cooperating screw and nut means, one of which is axially fixedly connected to said clamp member and the other of which is axially fixedly mounted with respect to said cooperating member, said screw and nut means thus being operative upon relative rotation in opposite directions to actuate said clamp member in opposite directions relative to said cooperating member.

34. The combination according to claim 31 characterized further in that said cooperating member is fixed relative to one mold section around the inner periphery of the latter.

35. The press of claim 1 characterized further in that there are means defining a chamber into which said diaphragm is thus turned inside-out, and means for supplying fluid under pressure into such chamber to actuate said diaphragm outside-in to its initial condition aforesaid wherein it extends between said mold sections.

36. The tire curing press of claim 35 wherein said means for turning said diaphragm inside-out comprises a movable member mounted externally of such chamber for engagement with said diaphragm to push the latter into such chamber.

37. The tire curing press of claim 35 characterized by the provision of means for admitting fluid under pressure between said head and the adjacent mold section to turn said diaphragm inside-out and to move the same into the first-named chamber.

38. The tire curing press of claim 37 wherein said last-named means is provided with a seat for engaging an edge of such carcass, and means for moving said seat relative to the surrounding mold section.

39. The tire curing press of claim 1 characterized by the provision of a movable plunger detachably engaging said diaphragm for turning the latter inside-out, and a surrounding movably supported member having a seat for engaging an edge of such carcass and adapted to be moved relative to the associated mold section to strip the carcass therefrom.

References Cited in the file of this patent

UNITED STATES PATENTS

| Number | Name | Date |
|---|---|---|
| 2,065,943 | Lerch et al. | Dec. 29, 1936 |
| 2,296,800 | Soderquist | Sept. 22, 1942 |
| 2,337,857 | Soderquist | Dec. 28, 1943 |
| 2,559,119 | Frank | July 3, 1951 |

FOREIGN PATENTS

| 644,428 | Great Britain | Aug. 27, 1947 |